United States Patent
Gibson

[15] 3,635,191

[45] Jan. 18, 1972

[54] TEXTILE PROCESS CONTROL

[72] Inventor: James Donald Mackay Gibson, Bramley, Leeds, England

[73] Assignee: I. W. S. Nominee Company Limited, London, England

[22] Filed: Feb. 6, 1969

[21] Appl. No.: 796,978

[30] Foreign Application Priority Data

Feb. 7, 1968 Great Britain..........................6,095/68

[52] U.S. Cl....................................118/7, 68/22 B, 118/405
[51] Int. Cl..............................................................B05c 11/10
[58] Field of Search.................68/22 B; 118/7, 405; 137/386

[56] References Cited

UNITED STATES PATENTS

| | | | |
|---|---|---|---|
| 2,415,644 | 2/1947 | Leonhard et al.....................137/386 X |
| 2,784,583 | 3/1957 | Dungler................................68/22 B X |
| 3,251,710 | 5/1966 | Taylor et al..............................118/7 X |
| 3,425,861 | 2/1969 | Jones........................................118/7 X |

FOREIGN PATENTS OR APPLICATIONS

| | | | |
|---|---|---|---|
| 275,768 | 9/1951 | Switzerland................................118/7 |
| 809,199 | 2/1959 | Great Britain..........................68/22 B |
| 830,836 | 3/1960 | Great Britain.............................118/7 |

Primary Examiner—John P. McIntosh
Attorney—Stowell & Stowell

[57] ABSTRACT

The level of liquid in the reservoir of impregnation apparatus, such as a pad mangle, is maintained substantially constant by control apparatus which includes a probe responsive to the level of liquid in the reservoir and producing a signal in dependence upon such level, the signal used to regulate the squeeze pressure applied to the material being impregnated. In one construction, the probe is a tube having one end open and located below the liquid level. Air is passed continuously through the tube and the back pressure set up constitutes the signal. This air pressure is transmitted to a pneumatic actuator operating a regulator valve, which controls the compressed air supply to pneumatic actuators responsible for the pressure on the nip of the mangle.

2 Claims, 1 Drawing Figure

PATENTED JAN 18 1972 3,635,191
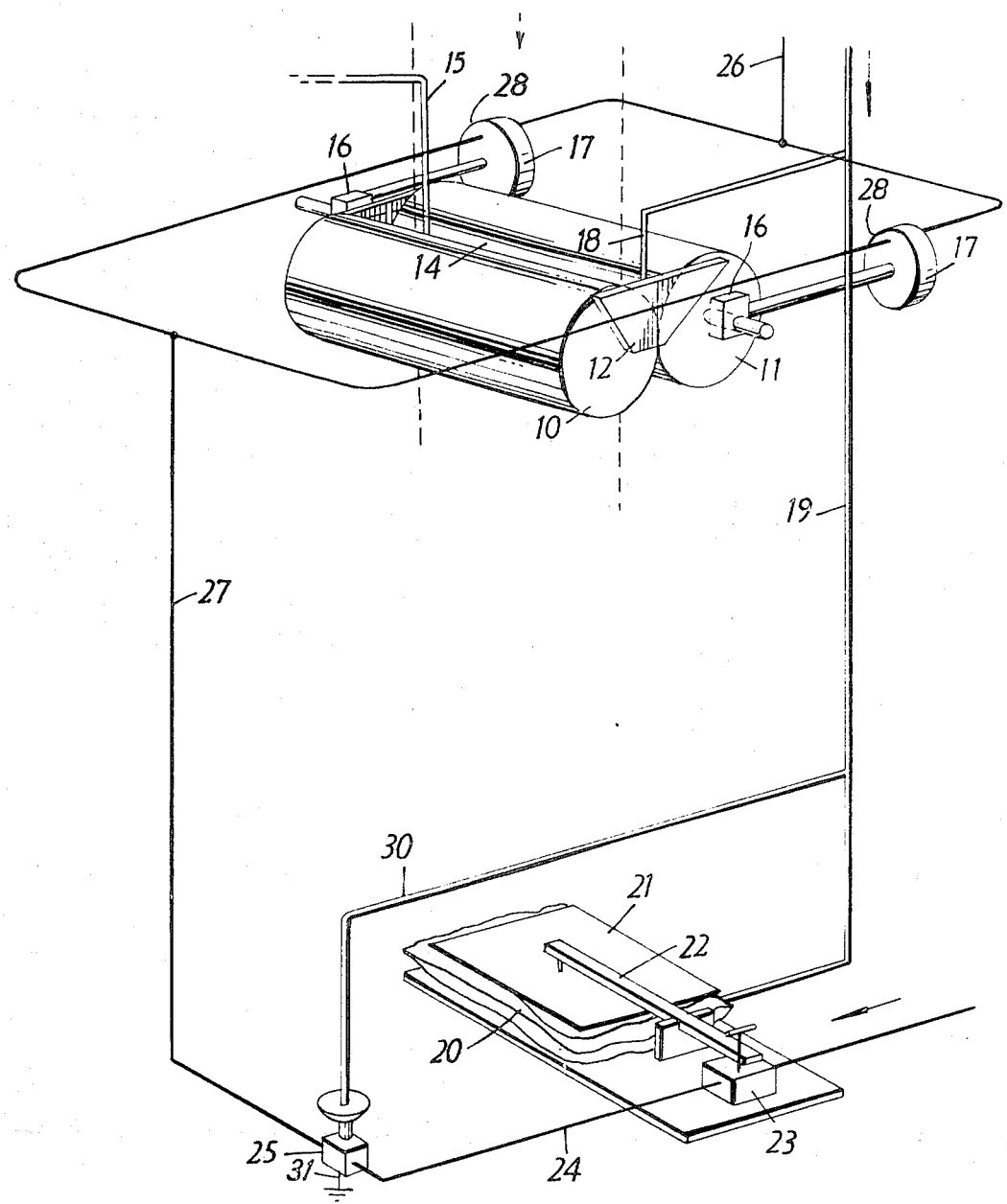
INVENTOR
JAMES DONALD MACKAY GIBSON
Stowell & Stowell
ATTORNEYS

TEXTILE PROCESS CONTROL

This invention is concerned with improvements in or relating to liquid level control systems for impregnation apparatus.

In particular, though not exclusively, it relates to a method and apparatus for controlling the level of liquid held in the reservoir of a padding apparatus as used for the continuous application of liquids to moving textile webs.

It is known in such apparatus to control manually the rate at which liquid is taken up into the material by increasing or decreasing the pressure of the nip formed by rotatable rolls between which the material passes. Such adjustment may be required, for example, when the absorbency of the material varies, and as the rate of supply of treating liquid to the reservoir is normally held at a constant value, the effect of a reduced takeup of liquid by the material is an increase in the height of liquid in the reservoir, and vice versa. To compensate manually for such variations may take up much valuable operator's time, and unless the liquid level is visually checked at frequent intervals, the degree of control achieved may not be sufficient to give an acceptably constant rate of liquid takeup by the material.

The invention provides control apparatus for automatically controlling the level of liquid contained in the reservoir of impregnation apparatus including means capable of supplying liquid at a constant rate to the reservoir, means for squeezing material impregnated with liquid from the reservoir, and squeeze adjustment means for varying the pressure which the squeeze means exerts on material passing therethrough, the control apparatus comprising level sensing means responsive to the level of liquid in the reservoir, and means responsive to a signal from the level sensing means to actuate the squeeze adjustment means in accordance with fluctuation of liquid level in the reservoir in such a manner that the rate of liquid uptake by the material is maintained substantially equal to the rate of supply of liquid to the reservoir.

The invention also resides in impregnation apparatus incorporating control apparatus as set out in the last preceding paragraph.

Preferably the pad treatment apparatus to which the control apparatus is applied is a pad-mangle having reservoir formed between and above two cooperating rolls which form the nip through which the material to be treated is passed, and the pressure adjustment means are operative to press one roll against the other roll with a predetermined and adjustable pressure.

Material treated in pad apparatus according to the invention benefits from the more constant application of treating liquid and constitutes another aspect of the invention.

The invention is applicable generally to the operation of impregnation apparatus and more particularly to pad-mangles. It is of especial advantage in the application of chlorinating solutions to wool materials, such as wool tops, for example in the context of the chlorine pretreatment and resin treatment process described in U.S. Pat. No. 1,074,731.

One embodiment of the invention will be described, by way of example, reference being had to the accompanying drawing, the single FIGURE of which shows diagrammatically control apparatus embodying the invention applied to a conventional pad-mangle suitable for the continuous pad treatment of textile material, for example, worsted fabric lengths.

The pad-mangle comprises a pair of cooperating driven rolls 10, 11, through the nip of which a length of textile material to be treated passes downwardly, as indicated by dotted lines. Side-sealing plates 12 (only one of which is shown) enable a reservoir of treating liquid 14 to be held above and between the rolls 10 and 11. In the operation of the apparatus, treating liquid is fed to the reservoir at a constant rate through a liquid supply line 15. The line is absorbed by material passing through the reservoir, while excess liquid is squeezed out by the rolls 10 and 11. The roll 10 is carried by fixed bearings in the machine frame (not shown), while the roll 11 is carried by bearings 16 which can move towards and away from the roll 10 in slides in the frame. Each bearing 16 is movable under the action of a pneumatic actuator 17 of the piston and cylinder type. The actuator 17 may alternatively be of the diaphragm type.

The control system applied to the pad-mangle comprises a level-sensing probe 18 in the form of a tube which has an open end located below the surface of the liquid within the reservoir 14. In the operation of the apparatus, air is passed continuously through the probe tube 18, from a supply source at a pressure in the range of 2 to 6-inches water gauge, so that air bubbles out through the liquid in the reservoir. A line, 19, which is in communication with both the supply source and the sensing probe 18, transmits air at a pressure substantially equal to the back pressure exerted by the head of liquid in the reservoir, and so provides a pressure signal proportional to the height of liquid in the reservoir.

The air line 19 is connected to a pressure sensitive device in the form of a flexible bag 20 to which is attached a metal diaphragm 21 connnected to one end of a lever 22 the other end of which operates a regulator valve 23 in an operating air line 24. Compressed air from a source at approximately 20 p.s.i. is fed into the line 24 as indicated by the arrow and is controlled by the valve 23 and to pressures within the range 0 to 20 p.s.i., and the controlled air passes by way of a pressure relief valve 25 and an air line 27 to air inlets 28 at one side of each of the pneumatic actuators 17. Air inlets at the other side of the actuators 17 are connected to a datum air pressure line 26, the datum pressure being variable to suit particular operating conditions or materials under treatment, but typically being of the order of 20 p.s.i. The balance of pressure applied to each side of the actuators 17 determines the pressure established between the rolls 10 and 11.

The pressure relief valve 25 incorporates a control diaphragm operable through a connecting air line 30 by the pressure in the air line 19. When the pressure in the air lines 19 and 30 falls below a limiting value, the pressure relief valve 25 acts to open the air lines 24 and 27 to atmosphere through an exhaust line, 31.

The operation of the control system will now be described, from the standpoint of a datum level of liquid in the reservoir 14, this datum being the average level desired in operation of the apparatus. Consider first a case of reduced absorbency of the material passing through the nip of the rolls 10, 11. This results in an increase in the height of liquid in the reservoir 14, and the resulting increased back pressure in the sensing probe 18 causes the bag 20 to inflate, thereby causing, through the lever 22, the regulator valve 23 to open to a degree which is proportional to the increase in back pressure set up in the probe 18. This permits compressed air in the line 24, to be transmitted to one side of the pneumatic actuators 17 at a pressure determined by the valve 23, thus partially relieving the pressure of the roll 11 against the roll 10. The resulting reduction of nip pressure results in less liquid being squeezed out of material passing through the nip, and the takeup of liquid by the material is thus increased and the level of liquid in the reservoir 14 begins to fall.

When the liquid level has fallen to a predetermined level, the reduced air pressure now existing in the line 19 causes the regulator valve 23 to close, and also operates the pressure relief valve 25 to permit the pressure in the lines 24 and 27, to fall to a value dependent on the pressure in the lines 19 and 30. The pneumatic actuators 17, are now relieved of back pressure and the roll 11 is subjected to an increased pressure by the actuators. If the liquid level in the reservoir again builds up, the operating cycle described repeats itself.

Normal operation of the control system thus involves a continuous slight fluctuation of the liquid level in the reservoir above and below a predetermined datum level, and the degree of control provided is related to the sensitivity of the control system.

Although in the apparatus described two cooperating rolls form the squeeze means, the invention is also applicable to systems in which the squeeze means is formed in other ways, for example by a single roller cooperating with a nonrotating surface, or by two mutually separable nonrotating surfaces.

The invention is furthermore applicable to control of padding apparatus in which the liquid reservoir is removed from the squeeze rolls, for example being located below the squeeze rolls. In this case material to be treated passes first through the reservoir and then progresses to the squeeze section, excess liquid draining down from the squeeze rolls in the reservoir.

I claim:

1. In impregnation apparatus comprising: opposed means for squeezing material impregnated with liquid therebetween; means cooperating with the opposed means to define a liquid reservoir therewith; means capable of supplying liquid at a constant rate to the reservoir; and squeeze adjustment means for varying the pressure which the opposed means exerts on material passing therebetween; control apparatus for automatically controlling the level of liquid contained in the reservoir comprising: level sensing means including a tubular probe having one end open and adapted to be located below the level of liquid in the reservoir; means for passing air through the probe; and means responsive to the pressure existing in the probe to provide a signal indicative of the said pressure and means responsive to the signal from the level sensing means to actuate the squeeze adjustment means in accordance with fluctuation of liquid level in the reservoir and thereby to maintain the rate of liquid uptake in the material substantially equal to the rate of supply of liquid to the reservoir, the pressure responsive means comprising a closed chamber adapted to expand in response to the pressure therein; and a conduit maintaining said chamber in communication with said probe, whereby said pressure is transmitted to the said chamber, and a fluid pressure regulator valve operatively connected to a wall of said chamber, said valve being adapted to regulate the pressure of an actuating fluid in dependence upon the level of liquid in the reservoir, whereby said fluid can be supplied for actuating said squeeze adjustment means on the impregnation apparatus, and a relief valve for said actuating fluid on the outlet side of said regulator valve, the relief valve being actuated by the pressure established in said probe to be opened to the atmosphere when the pressure in the probe falls below a predetermined value.

2. Impregnation apparatus comprising: a reservoir for liquid; means capable of supplying liquid at a constant rate to the reservoir; means for squeezing material impregnated with liquid; and squeeze adjusting means for varying the pressure which the squeeze means exerts on material passing therethrough; control apparatus for automatically controlling the level of liquid contained in the reservoir comprising: level-sensing means including a tubular probe having one end open and adapted to be located below the level of liquid in the reservoir; means for passing air through the probe; and means responsive to the pressure existing in the probe to provide a signal indicative of the said pressure; said means responsive to the pressure comprising: a closed chamber adapted to expand in response to the pressure therein; and a conduit maintaining said chamber in communication with said probe to transmit pressure to the said chamber; and means responsive to the signal from said level sensing means to actuate the squeeze adjustment means in accordance with fluctuation of liquid level in the reservoir and thereby to maintain the rate of liquid uptake by the material substantially equal to the rate of supply of liquid to the reservoir; said means responsive to the signal comprising: a fluid pressure regulator valve operatively connected to a wall of said chamber, said valve being adapted to regulate the pressure of an actuating fluid in dependence upon the level of liquid in the reservoir, whereby said fluid can be supplied for actuating said squeeze adjustment means on the impregnation apparatus, and a relief valve for said actuating fluid on the outlet side of said regulator valve, the relief valve being actuated by the pressure established in said probe to be opened to the atmosphere when the pressure in the probe falls below a predetermined level.

* * * * *